United States Patent [19]

Vogel et al.

[11] Patent Number: 5,045,516

[45] Date of Patent: Sep. 3, 1991

[54] PROCESS FOR PRODUCING A CATALYST FOR REDUCING NITROGEN OXIDES IN FLUE GASES

[75] Inventors: Doris Vogel, Erlangen; Norbert Landgraf, Rueckersdorf; Josef Sprehe, Fuerth-Vach; Wolfgang Gajewski, Buckenhof; Dietmar Hein, Nuremberg; Helmut Schmelz, Prien, all of Fed. Rep. of Germany

[73] Assignee: Siemens Aktiengesellschaft, Munich, Fed. Rep. of Germany

[21] Appl. No.: 313,701

[22] Filed: Feb. 21, 1989

[30] Foreign Application Priority Data

Feb. 23, 1988 [DE] Fed. Rep. of Germany ....... 3805564

[51] Int. Cl.$^5$ .................. B01J 21/06; B01J 23/22; B01J 23/28
[52] U.S. Cl. .................. 502/309; 423/239
[58] Field of Search .................. 502/309; 423/239 A

[56] References Cited

U.S. PATENT DOCUMENTS

| | | | |
|---|---|---|---|
| 3,614,809 | 10/1971 | Hayes et al. | 502/527 X |
| 3,632,709 | 1/1972 | Hayes et al. | 423/213.2 |
| 4,085,193 | 4/1978 | Nakajima et al. | 502/309 X |
| 4,466,947 | 8/1984 | Imanari et al. | 502/309 X |
| 4,891,348 | 1/1990 | Imanari et al. | 502/309 |

FOREIGN PATENT DOCUMENTS 2846476 5/1979 Fed. Rep. of Germany .
55-114335 9/1980 Japan .................. 423/239 A

*Primary Examiner*—W. J. Shine
*Attorney, Agent, or Firm*—Herbert L. Lerner; Laurence A. Greenberg

[57] ABSTRACT

A catalyst for reducing the nitrogen oxides in flue gases by a reducing agent and a catalytically active composition is described. The catalyst increases resistance to catalyst poisons such as arsenic trioxide. The composition contains 60-90% by weight of titanium, 10-30% by weight of molybdenum, and 0-10% by weight of vanadium, as their respective oxides. A very pure titanium dioxide having less than 500 ppm of calcium and less than 100 ppm of iron, and being 60% in the anastase modification. It has a mean particle size of 10 to 100 nm, a mean pore radius of 10 to 30 nm and a BET surface of 10 to 80 m$^2$ per gram. The catalyst is prepared by wet-grinding a suspension of the titanium dioxide with the vanadium pentoxide and molybdenum trioxide mill in stated proportions. The suspension is then dried, and precalcined for several hours at 450° to 550° C. The precalcined material is comminuted to smaller than 180 μm. The pulverized material is then mixed with water and coated on to metal substrate, dried and then calcined for several hours at 450° to 550° C.

9 Claims, 1 Drawing Sheet

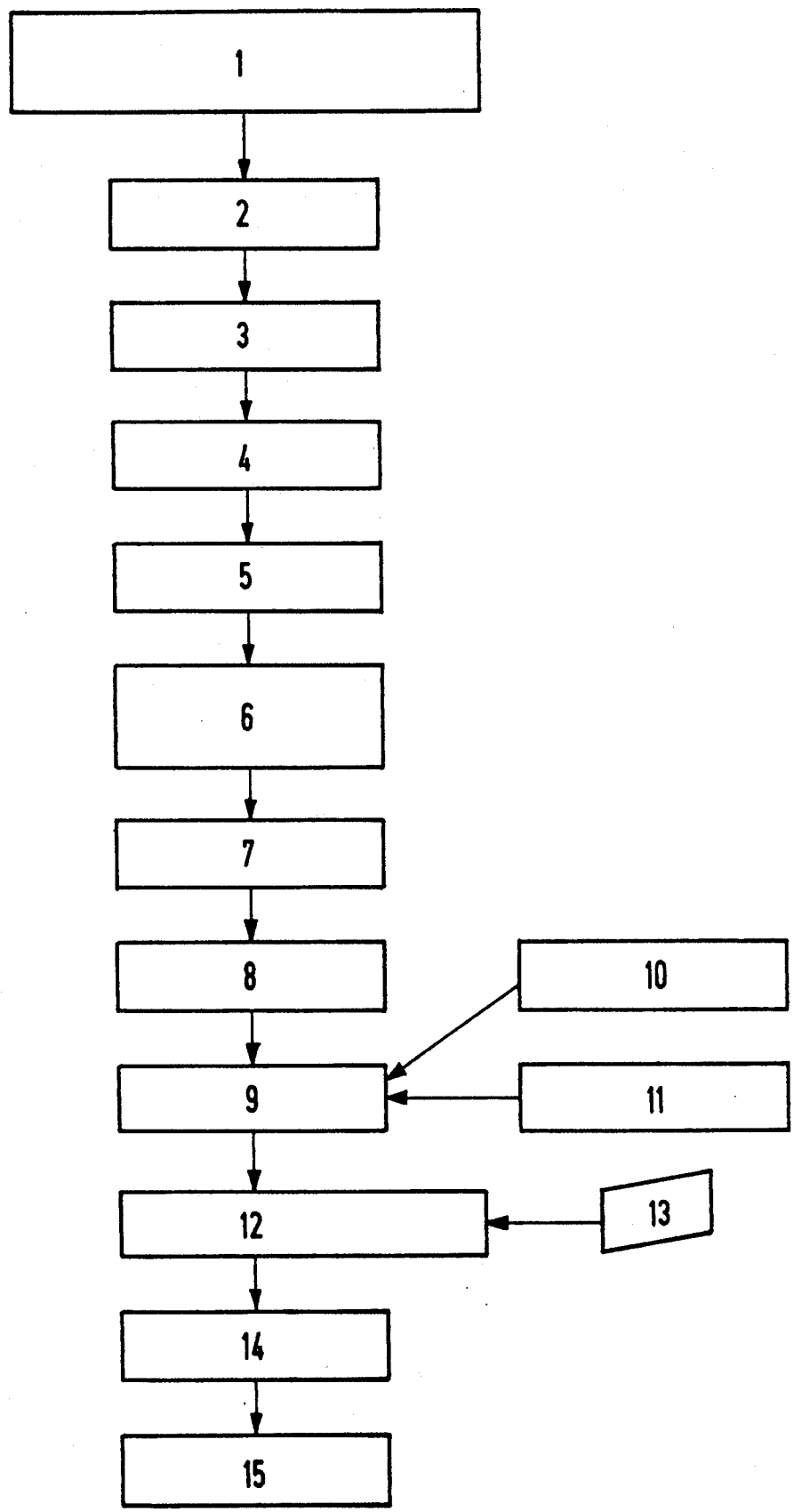

PROCESS FOR PRODUCING A CATALYST FOR REDUCING NITROGEN OXIDES IN FLUE GASES

The invention relates to a catalyst for reducing the nitrogen oxides in flue gases in the presence of a reducing agent and a process for the production thereof.

Power plants are typically equipped with dust removal systems, flue gas desulfurization systems and nitrogen removal systems, also known as de-NOx systems. The purpose of the de-NOx systems is to reduce the proportion of nitrogen oxides in the flue gases. The selective catalytic reduction process has become standard for this purpose. In the process, the nitrogen oxides are reduced to nitrogen and water by a reducing agent, which is typically ammonia in the presence of catalysts that substantially contain titanium dioxide and gain their catalytic activity from the addition of small amounts of transition metals. While the catalytic activity of such catalysts decreases hardly at all over the course of time with power plants having dry-chamber firing, the catalytic activity of such catalysts in power plants with slag firing and 100% ash recycling drops off sharply even after a relatively short period in operation. It has been shown that the decrease in catalytic activity is caused by the increase in concentration of catalyst poisons contained in the flue gas, such as arsenic trioxide in particular.

In order to avoid the deactivation of the catalysts, in power plants with slag firing and 100% ash recycling, a shift has already been made to carrying the flue gases through a flue gas desulfurization system prior to their introduction into the de-NOx system. As a result, only flue gases that are free of dust and are largely scrubbed, with the exception of the nitrogen oxides, reach the de-NOx system. However, such a system is relatively unfavorable from an energy standpoint, since the flue gases leaving the flue gas desulfurization system are in a temperature range that is markedly less than 100° C. because of the process, while on the other hand the operating temperatures of the subsequent flue gas nitrogen removal systems are at a level of 350° to 400° C. This means that in systems in which the de-NOx system is located downstream of the flue gas desulfurization system, the flue gases are reheated after the flue gas desulfurization system to approximately 350° to 400° C., and then these flue gases must then be cooled downstream of the de-NOx system to approximately 120° C.

It is accordingly an object of the invention to provide a catalyst for reducing nitrogen oxides and a process for the a production thereof, which overcome the hereinafore-mentioned disadvantages of the heretofore-known methods and products of this general type and which develop a de-NOx catalyst which is relatively invulnerable to catalyst poisons and has sufficiently high catalytic activity and can therefore be used even in power plants having slag firing and 100% ash recycling upstream of the flue gas desulfurization system.

With the foregoing and other objects in view there is provided, in accordance with the invention, a catalyst for reducing the nitrogen oxides in flue gases in the presence of a reducing agent, comprising a catalytically active composition for increasing resistance to catalyst poisons such as arsenic trioxide, including 60-90% by weight of titanium, 10-30% by weight of molybdenum, and 0-10% by weight of vanadium, the titanium being added in the form of titanium dioxide, the molybdenum being added in the form of molybdenum trioxide, and the vanadium being added in the form of vanadium pentoxide; the composition being formed from a basic material including a highly pure titanium dioxide having fewer than 500 ppm of calcium and fewer than 100 ppm of iron, said $TiO_2$ being present to a proportion of over 60% in the anastase modification, and having a mean particle size of 10 to 100 nm, a mean pore radius of 10 to 30 nm and a BET surface of 10 to 80 $m^2$ per gram.

In accordance with another feature of the invention, the anastase proportion of the titanium oxide is over 75%.

In accordance with a further feature of the invention, the mean primary particle size is between 40 and 50 nm.

In accordance with an added feature of the invention, the BET surface of the titanium oxide used is between 10 and 50 $m^2/g$.

In accordance with an additional feature of the invention, the mean macropore radius of the titanium oxide used is between 15 and 20 nm.

Due to the use of a catalytically active composition including from 60-90% by weight of titanium, 10-30% by weight of molybdenum and 0-10% of vanadium, where titanium is in the form of titanium dioxide, molybdenum is in the form of molybdenum trioxide and vanadium is in the form of vanadium pentoxide, and where over 60% of the titanium oxide is present in the anastase modification, a catalyst is obtained having a basic activity which is superior to other de-NOx catalysts. Due to the mean particle size of 10 to 100 nm, the mean pore radius of 10 to 30 nm and the resultant BET surface of 10 to 80 $m^2$ per gram, the danger of desublimation of arsenic trioxide that exists in the operating temperature range of 350° to 400° C. is furthermore markedly lessened.

The high degree of purity of the basic tiranium dioxide substance used, which is less than 500 ppm of calcium and less than 100 ppm of iron has had a positive effect on the service life of the catalyst made from it. The primary or initial particle size of the titanium dioxide used also plays an important role, as will be demonstrated below.

The service life can be even further improved if, with the Objects of the invention in view, there is also provided a process for producing a catalyst for reducing the nitrogen oxides in flue gases in the presence of a reducing agent from a catalytically active composition for increasing resistance to catalyst poisons such as arsenic trioxide, which comprises preparing a basic titanium dioxide material including a very pure titanium dioxide having fewer than 500 ppm of calcium and fewer than 100 ppm of iron, being present to a proportion of over 60% in the anastase modification, and having a mean particle size of 1 to 100 nm, a mean pore radius of 10 to 30 nm and a BET surface of 10 to 80 $m^2$ per gram: wet-grinding a catalytic suspension of the basic titanium dioxide material along with vanadium pentoxide and molybdenum trioxide in an agitator mill in proportions of 60-90% by weight of titanium, 10-30% by weight of molybdenum, and 0-10% by weight or vanadium, the titanium being added in the form of titanium dioxide, the molybdenum being added in the form of molybdenum trioxide, and the vanadium being added in the form of vanadium pentoxide; subsequently drying the catalytic suspension; subsequently comminuting and precalcining the dried catalytic material for several hours at 450° to 550° C.; comminuting the precalcined material in a pulverization stage to a particle range having particle diameters smaller than 180 μm; subsequently mixing the pulverized material with water to form a wet composition: placing the wet composition on an expanded metal substrate or plate: drying the wet composition on the metal substrate; and subsequently calcining the wet composition on the metal substrate for several hours at 450° to 550° C.

In accordance with another mode of the invention, there is provided a process which comprises performing the step of drying the catalytic suspension by filter pressing and subsequent expulsion of remaining water by heating.

In accordance with an added mode of the invention, there is provided a process which comprises performing the step of drying the catalytic suspension by thermal methods.

In accordance with an additional mode of the invention, there is provided a process which comprises adjusting the water content of the suspension to from 18 to 22% by weight prior to the step of placing or coating the wet composition on the metal substrate or plate.

In accordance with yet another mode of the invention, there is provided a process which comprises adding a proportion of fiber solids of from 1 to 10% by weight, with respect to the dry catalyst composition, to the suspension along with the water prior to the step of placing the wet composition on the metal substrate.

In accordance with yet a further mode of the invention, there is provided a process which comprises employing aluminum silicate fibers as the fiber solids.

In accordance with a concomitant mode of the invention, there is provided a process which comprises employing glass fibers having small proportions of alkali metals and alkaline earth metals as the fiber solids.

The precalcination causes some of the molybdenum trioxide which is used to enter the gas phase and precipitate onto the vanadium pentoxide which coats the titanium dioxide crystallites. The molybdenum trioxide then protects these catalyst components from poisoning with arsenic compounds, in particular arsenic trioxide. Furthermore, the molybdenum trioxide assures a marked improvement in adhesion of the microcrystallites to one another. Due to this succession of steps, a structure of the catalytically active composition is also attained which combines high catalytic activity with very low sensitivity to catalytic poisons such as arsenic compounds, selenium compounds, mercury, and so forth.

Other features which are considered as characteristic for the invention are set forth in the appended claims Although the invention is illustrated and described herein as embodied in a catalyst for reducing nitrogen oxides and process for the production thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The drawing is a flow chart illustrating the production process for the catalyst according to the invention.

According to the invention, highly pure titanium dioxide is used for producing the catalyst Preferably, it should contain less than 100 ppm of calcium and less than 10 ppm of iron, and preferably more than 75% of it is in the anastase modification. Since iron and calcium are known adsorbants for arsenic trioxide in their oxide form, it is suitable for the proportion thereof in the basic titanium dioxide material to be kept as low as possible. This titanium dioxide used as a basic material should preferably have a primary particle size of 40 to 50 nm, a BET surface of 10 to 50 $m^2/g$ and a macropore radius of 15 to 20 nm. A basic titanium dioxide material of this kind can be produced by the known aerosol process with titanium dioxide from the chloride process. Due to the high proportion of the basic titanium dioxide material in the catalytically active composition, which is on the order of magnitude of 60 to 90% by weight, it contributes substantially to the later properties of the material.

Referring now in detail to the single figure of the drawing, it is seen that according to the exemplary embodiment, the titanium dioxide is used together with vanadium pentoxide and molybdenum trioxide at reference numeral 1 and it is wet-ground in an agitator mill 2, which is preferably an attritor mill. The additives should be selected in such a way that the mixture contains from 60 to 90% by weight of titanium, 0 to 10% by weight of vanadium and 10 to 30% by weight of molybdenum as their respective oxides. The grinding process is continued until such time as suitable particle sizes, on the order of approximately 50 nm, are attained. Next, the thus-obtained catalyst suspension is removed and dried. This drying is carried out in two process steps 3, 4; the first process step 3 includes filter pressing, and the second process step 4 includes an expulsion of the remaining water by heating. The dried catalytic material thus obtained is subsequently delivered to a comminution stage 5 and after that to a calcining stage 6, in which it is precalcined for several hours at 450° to 550° C.

The stone-hard precalcined material is subsequently subjected to a pulverization step 7. In the exemplary embodiment, this is carried out with a beater mill, but other grinding mechanisms can be used equally well. The particle range sought is less than 180 μm. The resultant ground product is then sifted at reference numeral 8. While the particle fractions having particle diameters over 180 μm are returned to the beater mill, the sifted-out finer particle fraction stage 9. In the exemplary embodiment, aluminum silicate fibers 11 are added to this slurry. The proportion of fiber solids is set to from 1 to 10% by weight of the dry catalyst material. This heterogeneous mixture is mixed in a kneading mechanism associated with the processing stage 9, with simultaneous adjustment of a water content of from 18 to 20%. The moist composition produced is rolled out onto a metal substrate 13 in a processing stage 12. In the exemplary embodiment, the substrate is in the form of expanded metal plates flame-sprayed with aluminum. In a further processing stage 14, the thus-coated catalyst plates are then carefully predried and then calcined for several hours in a calcining furnace 15 at 450° to 550° C. The predrying that precedes the calcining can be carried out between layers of filter paper, in order to prevent shrinkage cracks. These shrinkage cracks can also be made to close again by prompt rerolling.

The end product is a highly active, abrasion-resistant catalyst plate that is distinguished by a high internal strength and good bonding to the metal substrate and is relatively insensitive to catalyst poisons, such as arsenic (III) oxide in particular. The precalcining has had the result of causing the vanadium pentoxide to surround the surface of the titanium dioxide microcrystallites with a monomolecular film and to be coated with molybdenum trioxide in turn together with it. These molybdenum trioxide sheets protect the titanium dioxide microcrystallites located beneath them and the vanadium pentoxide coating them from arsenic poisoning, and in particular from the chemical attack of the vanadium pentoxide by the arsenic trioxide. In the case of flue gases containing a very high proportion of arsenic, the service life can be increased even further by reducing the vanadium content In that case, however, a certain loss of primary activity must be accepted into the bargain. The comparatively lower sensitivity to arsenic compounds is also the result of the relatively high macropore radius of the catalytic composition, on the order of magnitude of 15 to 20 nm. This is because the vapor pressure over convex surfaces is reduced all the more, as the radius of curvature becomes shorter. The relatively large macropore radius very sharply reduces any desublimation of arsenic trioxide in these pores. The bonding property of the material is further reinforced by the addition of preferably from 1 to 3% by weight of fiber solids, as a proportion of the dry catalyst composition. Aluminum silicate fibers and glass fibers have proved to be particularly valuable, because of the temperature resistance thereof. The bonding strength is also greatly co-determined by the proportion of molybdenum trioxide. Expanded metal plates and wire cloths that have previously been flame-sprayed with aluminum have proved particularly useful as the substrate material.

We claim:

1. A process for producing a catalyst for reducing the nitrogen oxides in flue gases in the presence of a reducing agent from a catalytically active composition consisting essentially of a mixture of basic titanium oxide, molybdenum trioxide and from 0 to 10% by weight of vanadium as the pentoxide for increasing resistance to catalyst poisons, said titanium oxide comprising a highly pure titanium dioxide having less than 500 ppm of calcium and less than 100 ppm of iron, said $TiO_2$ being present in a proportion of over 60% as the anastase modification, and having a mean particle size of 10 to 100 nm, a mean pore radius of 10 to 30 nm and a BET surface of 10 to 80 $m^2$ per gram; which comprises the steps of a) mixing said oxides and suspending same in water;
b) wet-grinding the suspension of said basic titanium dioxide, vanadium pentoxide and molybdenum trioxide in an agitator mill in proportions of 60-90% by weight of titanium as the dioxide, 10-30% by weight of molybdenum as the trioxide, and 0-10% by weight of vanadium as the pentoxide;
c) drying the ground mixture suspension;
d) comminuting and precalcining the dried material for several hours at 450° to 550° C.;
e) comminuting the precalcined material to a particle range having particle diameters less than 180 $\mu$m;
f) wetting the comminuting material with water to form a wet composition;
g) coating a metal substrate with said wetted composition; and
h) drying said coating on said metal substrate; and subsequently calcining the coating on the metal substrate for several hours at 450° to 550° C. to form a catalytically active material.

2. The process according to claim 1 which comprises drying the ground mixture c) by first filter pressing and then expelling the remaining water by heating.

3. The process according to claim 1, which comprises drying the ground mixture c) by thermal methods.

4. The process according to claim 1, which comprises adjusting the water content of the wet composition to from 18 to 22% by weight e) prior to the step of placing the wet composition f) on the metal substrate.

5. The process according to claim 1, which comprise admixing fiber solids of from 1 to 10% by weight with respect to the dry final composition, with the precalcined material e) together with the water prior to the step of coating the wet composition f) on the metal substrate g).

6. The process according to claim 5, wherein aluminum silicate fibers are the fiber solids.

7. The process according to claim 5, wherein glass fibers having reduced proportions of alkali metals and alkaline earth metals are the fiber solids.

8. The process according to claim 1, wherein said metal substrate being coated has an expanded metal surface.

9. The process according to claim 8, wherein said expanded metal surface has voids formed therein, and said substrate having an expanded metal surface is an expanded metal sheet and said surfaces are coated and the voids are filled with said composition.

* * * * *